(12) United States Patent
Choi

(10) Patent No.: US 10,391,756 B2
(45) Date of Patent: Aug. 27, 2019

(54) PORTABLE 3D PRINTER

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 102 days.

(21) Appl. No.: 15/381,339

(22) Filed: Dec. 16, 2016

(65) Prior Publication Data

US 2017/0173890 A1    Jun. 22, 2017

(30) Foreign Application Priority Data

Dec. 18, 2015    (KR) .................. 10-2015-0182018

(51) Int. Cl.

| | |
|---|---|
| *B29C 64/00* | (2017.01) |
| *B33Y 30/00* | (2015.01) |
| *B29C 64/227* | (2017.01) |
| *B29C 64/232* | (2017.01) |
| *B29C 64/20* | (2017.01) |
| *B29C 64/314* | (2017.01) |
| *B29C 64/209* | (2017.01) |
| *B29C 64/236* | (2017.01) |
| *B29C 64/245* | (2017.01) |
| *B29C 64/30* | (2017.01) |
| *B29C 64/112* | (2017.01) |
| *B29C 64/118* | (2017.01) |
| *B29C 64/106* | (2017.01) |

(52) U.S. Cl.
CPC ............ *B33Y 30/00* (2014.12); *B29C 64/112* (2017.08); *B29C 64/20* (2017.08); *B29C 64/209* (2017.08); *B29C 64/227* (2017.08); *B29C 64/232* (2017.08); *B29C 64/236* (2017.08); *B29C 64/245* (2017.08); *B29C 64/30* (2017.08); *B29C 64/314* (2017.08); *B29C 64/106* (2017.08); *B29C 64/118* (2017.08)

(58) Field of Classification Search
CPC ................................ B29C 64/38; B29C 64/40
See application file for complete search history.

(56) References Cited

U.S. PATENT DOCUMENTS

| | | | | |
|---|---|---|---|---|
| 1,395,593 A | * | 11/1921 | Oknianski | ................ G02C 5/22 16/228 |
| 3,687,408 A | * | 8/1972 | Lake | ................... B65B 67/1205 248/97 |
| 4,817,241 A | * | 4/1989 | Koch | ........................ E05D 3/16 16/238 |

(Continued)

OTHER PUBLICATIONS

Foldie3D—https://www.thingiverse.com/thing:558317; See embedded image gallery collection (Year: 2015).*

(Continued)

*Primary Examiner* — Robert C Dye
*Assistant Examiner* — Nicholas R Krasnow
(74) *Attorney, Agent, or Firm* — Bacon & Thomas, PLLC

(57) ABSTRACT

A portable 3D printer where the upper surface plate and the lower surface plate are rotated upward and downward at an angle of 270°, respectively, and the upper surface plate, the lower surface plate and the vertical support plate are adjacent to the respective first, second, third and further oblique plates. The adjacent portion is 0-90° such that the summations of the internal angles of the adjacent portions become a right angle of 90° thereby to provide a stable 3D printer when it is used and to be folded as a thin film structure when it is carried.

1 Claim, 6 Drawing Sheets

(56) References Cited

U.S. PATENT DOCUMENTS

| | | | |
|---|---|---|---|
| 4,927,104 A * | 5/1990 | Miller | B65B 67/1205 248/150 |
| 2003/0177961 A1 * | 9/2003 | Wang | A47B 3/0818 108/126 |
| 2006/0061613 A1 | 3/2006 | Fienup et al. | |
| 2006/0272275 A1 * | 12/2006 | Riesmeier | A47B 96/202 52/745.19 |
| 2007/0035655 A1 * | 2/2007 | Chen | H04N 1/04 348/373 |
| 2007/0235600 A1 * | 10/2007 | Herold | B65F 1/1415 248/97 |
| 2011/0102328 A1 * | 5/2011 | Chen | G06F 1/1618 345/169 |
| 2011/0115849 A1 | 5/2011 | Seki et al. | |
| 2016/0297142 A1 * | 10/2016 | Bheda | B33Y 70/00 |
| 2017/0113826 A1 * | 4/2017 | Ristoski | B65B 67/1205 |
| 2017/0238595 A1 * | 8/2017 | Atureliya | F16C 29/008 |

OTHER PUBLICATIONS

Adetutu—https://github.com/EmmanuelAdetutu/TeeBotMax/blob/master/TeeBotMax_Build_Plan.pdf (Year: 2014).*

Lumifold—https://web.archive.org/web/20131201010816/http://www.indiegogo.com/projects/lumifold-the-foldable-photo-activated-resin-based-3d-printer (Year: 2013).*

* cited by examiner

PORTABLE 3D PRINTER

CROSS-REFERENCE TO RELATED APPLICATION

This application claims under 35 U.S.C. § 119(a) the benefit of Korean Patent Application No. 10-2015-0182018 filed on Dec. 18, 2015, the entire contents of which are incorporated herein by reference.

BACKGROUND OF THE INVENTION

(a) Technical Field

The present invention relates to a portable 3D printer, and more particularly, to a portable 3D printer which is folded and carried as a thin film card and in which each element is deployed at a right angle of 90° and fixed to serve as a 3D printer.

(b) Background Art

Recently, the interest in 3D printer has been increased. Here, the demand for the 3D printer has been made, which is linked with a smart phone, and receives data through the smart phone while being carried in a smart phone size and through which the data is printed.

Here, a 3D printer is a kind of printers which printers an object in frontward and rearward direction, in upward and downward direction, that is frontward and rearward direction, leftward and rightward direction and upward and downward direction and laminates them.

According to a related art, 3D printers are fixed to some bases plates, which are very difficult to be carried.

For this reason, the left and right horizontal degrees of the 3D printer have to be accurate and further up and down angles have to be accurate as a right angle of 90° so that there are limitations to ensure preciseness when each component is folded and deployed.

PATENT DOCUMENT

US 2005 022500
US 2006 0061613
US 2011 0115849

SUMMARY OF THE INVENTION

The present invention has been proposed to solve the above problems and an object of the present invention is to provide a portable 3D printer which can be carried together with a smart phone, can be developed easily when it is used to print accurately an object with firm structure.

As shown in FIGS. 1, 2(a), (b), (c), (d), a portable 3D printer of the present invention may include: an upper surface plate (1), a vertical support plate (2), an up and down support plate (3) and a lower surface support plate (4) as a whole structure; a nozzle (7b) for ejecting printing material on the upper surface plate (1);

a front and rear moving means for moving the nozzle (7b) frontward and rearward; a left and right moving means for moving the front and rear moving means leftward and rightward; an up and down moving means provided on the vertical support plate (2) and an up and down moving plate (3) which is connected to the up and down moving means; and an electronic circuit for controlling the moving motors (15a, 17, 25) which are connected to the up and down moving means, the left and right moving means and the front and rear moving means, which is provided on the lower surface plate 4 wherein an upper end of the vertical support plate (2) is linked with the upper surface plate (1) and the rotation base shaft (6) such that the vertical support plate (2) is rotated at an angle of 270° or more, the lower end of the vertical support plate (2) is linked with the lower surface plate (4) and the rotation base shaft (7) such that the vertical support plate (2) is rotated at an angle of 270° or more, and a middle end of the vertical support plate (2) is provided with the up and down moving plate 3 to be rotated upward and downward at an angle of 90° so that the upper surface plate (1), the up and down moving plate (3) and the lower surface plate (4) are arranged at a right angle of 90° when it is used, and the upper surface plate (1), the up and down moving plate (3) and the lower surface plate (4) are folded as a thin film structure based on the vertical support plate (2) when it is carried.

The summations of the internal angle <A of a first oblique support plate (12) over the vertical support plate (2) and a second oblique support plate (28) of the upper surface plate (1), the internal angle <C of the up and down moving plate (3) and the up and down moving plate (23) which are provided on a middle of the vertical support plate (2) and the internal angle <B of a third oblique support plate (29) on a lower end of the vertical support plate (2) and a fourth oblique support plate (41) of the lower surface plate (4) may become 90°, respectively.

The rotation shaft structure of the moving motors (15a, 17d, 25 which are used for the front and rear moving plate (16), the left and right moving plate (17a) and the up and down rotation shaft (24) may be formed as the moving shaft (52) which passes through the inside of the motor.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
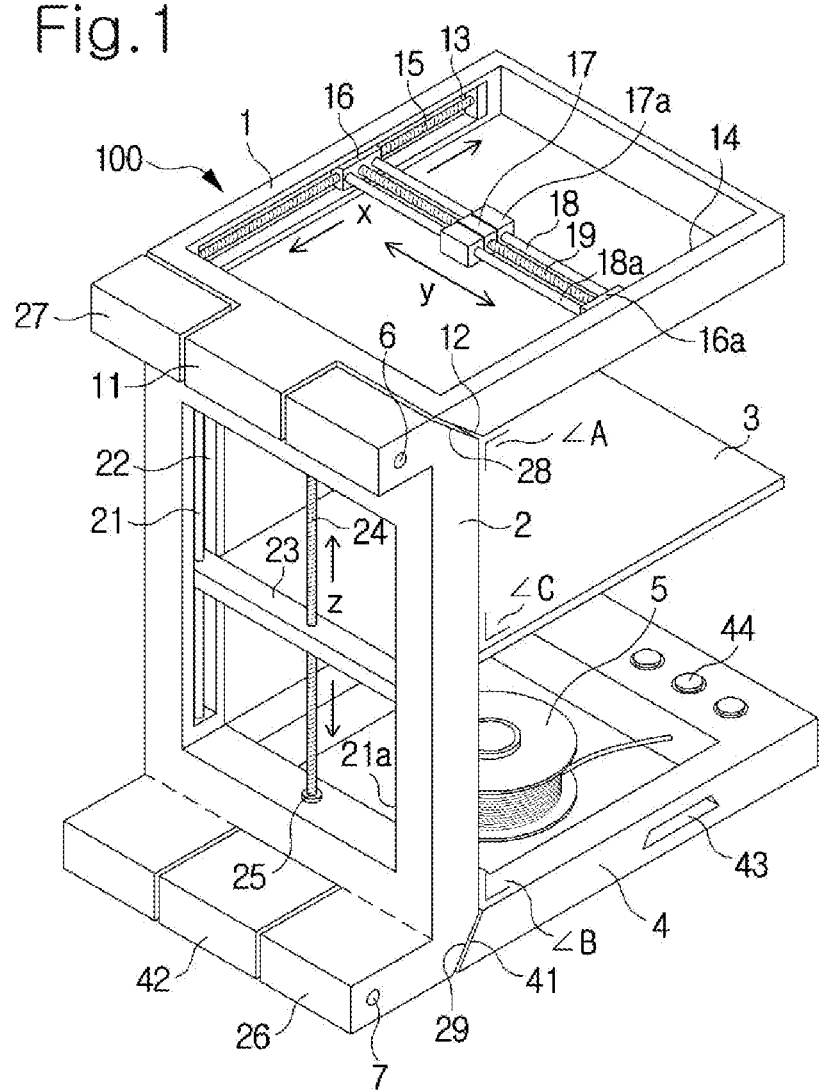
FIG. 1 is a schematic perspective view of a portable 3D printer according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in more detail with reference to the accompanying drawings illustrating embodiments of the present invention.

Figure 2:
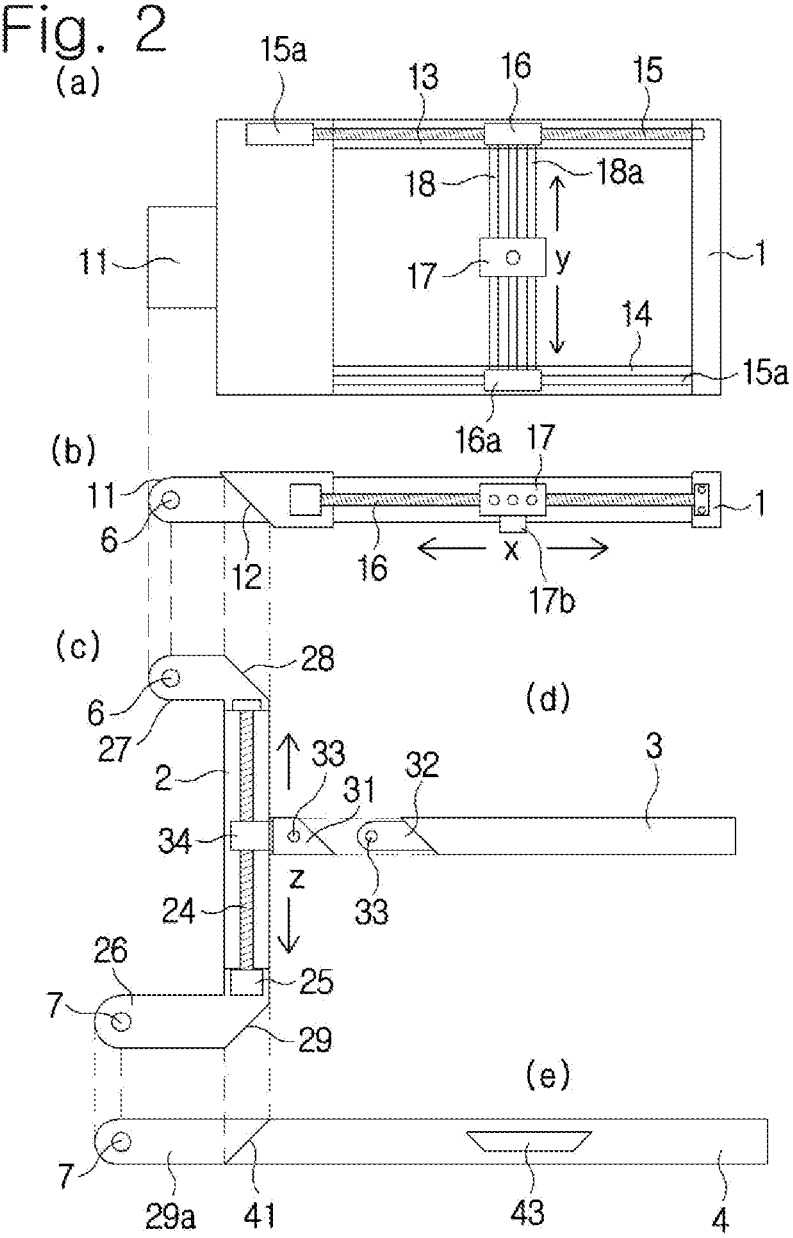
FIG. 2 is a schematic perspective view of an up and down surface and a vertical support plate in a portable 3D printer according to the present invention.

As shown in FIGS. 1 and 2 (a), (b), (c) and (d), a portable 3D printer 100 according to the present invention may include: an upper surface plate 1, a vertical support plate 2; an up and down moving support plate 3 and a lower surface plate 4 wherein the upper surface plate 1 includes a nozzle (not shown) for ejecting printing material, a front and rear moving means for moving the nozzle frontward and rearward, and a left and right moving means for moving the up and down moving means leftward and rightward.

Here, the vertical support plate 2 includes a moving means which moves upward and downward therein and the up and down moving plate 3 is connected to the moving means. The lower plate 4 includes an electron circuit for controlling a moving motor (15a, 17, 25) which is connected to the up and down moving means, the left and right moving means and front and rear moving means.

Meanwhile, an upper end of the vertical support plate 2 is provided to the upper surface plate 1 through an upper rotation base shaft 6 such that the vertical support plate 2 can be rotated at 270° or more, the lower end of the vertical support plate 2 is provided to the lower surface plate 4 through a lower rotation base shaft 7 such that the vertical support plate 2 can be rotated at 270° or more and the up and down moving plate 3 is provided to a lower end of the vertical support plate 2 such that the up and down moving plate 3 can be rotated upward and downward at 90°.

Accordingly, when the portable 3D printer of the present invention is used, the upper surface plate 1, the up and down moving plate 3 and the lower surface plate 4 are arranged at a right angle of 90° based on the vertical support plate 2, and when the portable 3D printer is carried, the upper surface plate 1, the up and down moving plate 3 and the lower surface plate 4 are folded to form a thin film structure for easy carrying based on the vertical support plate 2.

Further, the embodiments of a front and rear moving means for moving the nozzle 7b frontward and rearward, a left and right moving means for moving the front and rear moving means leftward and rightward, and an up and down moving means will be described in detail referring to drawings.

However, the front and rear moving means, the left and right moving means and up and down moving means are not limited to the following embodiments and thus variations are to be made thereto so long as the front and rear moving means is provided on the upper surface plate 1 and the up and down moving plate 3 is provided to the vertical support plate 2.

The vertical support plate 2 having a moving means which moves upward and downward inside and the configuration of the moving means will be described below.

The respective moving means are not limited to these embodiments and applied to all moving means including the front and rear moving means and the left and right moving means provided inside the upper surface plate 1 and the moving means for moving the up and down moving plate 1.

As shown in FIG. 1, the portable 3D printer according to the present invention includes an upper surface plate 1, a vertical support plate 2 and a lower surface plate 4.

Here, the upper surface plate 1 is provided with an upper surface protrusion plate 11 on a center of a rear surface, and a middle portion of which is opened and a slope surface of which is formed as a frame.

Meanwhile, a front and rear horizontal grooves (13, 14) are formed inside the left and right frames in the upper surface plate 1 such that when screw is rotated through a front and rear rotation moving shaft 15, a front and rear moving plate 16 which is linked to the front and rear rotation shaft are moved frontward and rearward. The front and rear moving shaft 15 has front and rear horizontal grooves 13, 14 on inner both sides, respectively, which may be arranged horizontally, or one of them may be formed as a screw type and the other may be formed as a guide bar.

Further, a left and right moving plate 17 is provided on the left and right and front and rear rotation moving shaft 15 and the left and right moving shafts 18, 18a are provided on left and right sides of the left and right moving plate 17 and the left and right moving shafts 18, 18a are provided on both left and right sides of the left and right moving plate 17 for allowing the left and right moving plate 17 to be moved horizontally, and the left and right rotation shaft 19 which moves leftward and rightward along screw in accordance with the rotation of a motor is proved at a center.

Addition, the left and right moving motor 17a is provided on a middle of the left and right moving plate 17 is provided and a nozzle (not shown) for ejecting printing material is provided on a lower part of the left and right moving plate 17.

As shown in FIG. 2(b), a first oblique support plate 12 is provided on a rear end of the upper surface support plate 1 at an angle of 45° and a base shaft 6a is provided on the location of the rear upper surface protrusion 11.

As shown in FIGS. 1 and 2(c), a second oblique support plate 28 is provided on an upper surface of the vertical support plate 2 at a frontward angle of 45°, a groove is formed at a middle of the upper surface support plate 27, into which the supper surface support plate 11 is inserted, and the rotation base shaft 6 is provided leftward and rightward to be connected to the rotation base shaft 6 of the upper surface support plate 1 such that the upper surface support plate 1 can rotate at an frontward and rearward direction angle of 270° or more.

Further, a third oblique support plate 29 is provided on a lower surface of the vertical support plate 2 at a frontward angle of 45°, a middle of the lower surface support plate 29s is perforated to be engaged with the lower surface protrusion 29a of the lower surface plate 4, and the protrusion of the lower surface support plate 29a is linked with the rotation base shaft 7 such that the lower surface plate 4 rotates upward and downward at an angle of 270° around the rotation base shaft 7.

AS shown in FIGS. 1 and 2(e), a portable 3D printer according to the present invention is provided with a lower surface plate 4, the material for printing and a control circuit 41 for controlling an moving motor frontward and rearward, leftward and rightward and upward and downward therein.

As shown in FIGS. 1, and 2(c), the inside of the vertical support plate 2 is perforated, the moving grooves 22 are formed vertically on both left and right sides and an up and down moving shaft 21 is provided therein.

Here, a horizontal moving plate 23 is arranged horizontally toward both directions of the up and down moving shaft 21, an up and down rotation shaft 24 on which threads are formed is provided vertically on a middle of the horizontal moving plate, and an up and down motor 25 is provided on a lower part of the horizontal moving plate 23.

Figure 3:
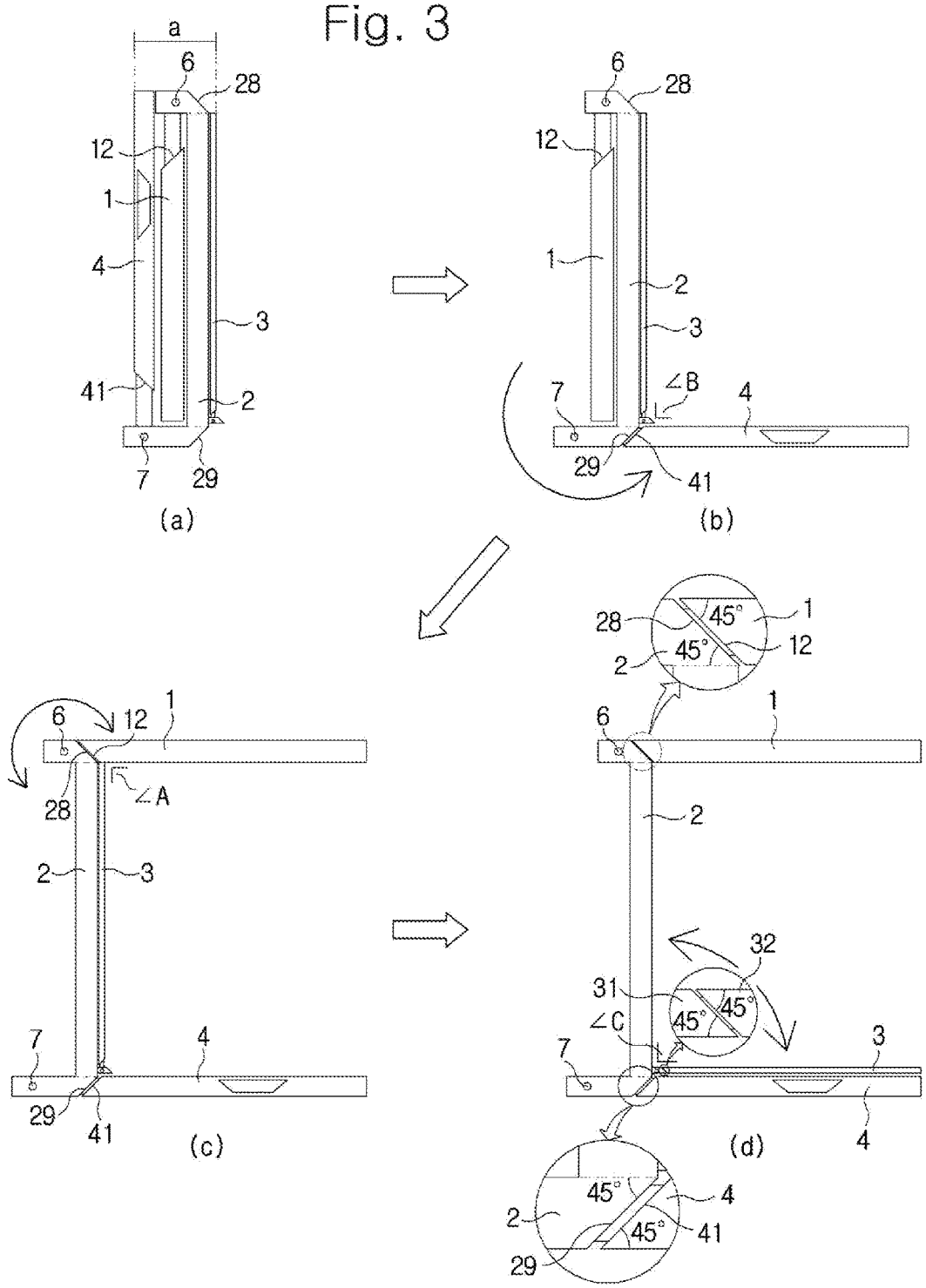
FIG. 3 is a schematic deployed view of a portable 3D printer according to the present invention.

As shown in FIGS. 3(a) and 3(b), in a state of the portable 3D printer being folded the lower surface plate 4 is rotated downward at an angle of 270° around the rotation base shaft 7 and thus that the third oblique plate 29 of 45° and the fourth oblique plate 41 of 45° are engaged such that the horizontal support plate 2 and the lower surface plate 4 are arranged at a right angle of 90°.

As shown in FIG. 3(c), the upper surface plate 1 is rotated at an angle of 270° around the rotation base shaft 6 based on the horizontal support plate 2 such that the second oblique plate 28 and the first oblique plate 1 are engaged and arranged at a right angle of 90° based on the horizontal support plate 2.

Accordingly, as shown in FIG. 3(c), the upper surface plate 1 and the lower surface plate 4 are arranged accurately at a right angle of 90° based on the horizontal support plate 2.

Meanwhile, a fifth oblique plate 31 is provided on a front of the horizontal support plate 23 and a sixth oblique plate 32 is provided on a rear end of the up and down moving support plate 3 to be linked with the rotation base shaft 33. That is, the angle formed with the engagement of the third oblique plate 29 and the fourth oblique plate 41 provided one side of the up and down moving plate 23 becomes 90° based on the vertical support plate 2.

As shown in FIGS. 1 and 3(a), 3(c), 3(d), the summation of the internal angles <A, <B and <C formed by the first, second, third and fourth oblique plates 12, 28, 29, 41, 31,31 becomes 90°.

That is, as shown in FIG. 3(b), with the relation of the internal angle <B of the third oblique plate 29 and the fourth oblique plate 41, when the internal angle of the third oblique plate 29 is 0, the internal angle of the fourth oblique plate 41 becomes 90°. That is, when the internal angle of the third oblique plate 29 is 30°, the internal angle of the fourth oblique plate 41 has to be 60°.

Accordingly, the oblique surface of the third oblique plate 29 and the oblique surface of the fourth oblique plate 41 becomes from 0 to 90°.

This principle is applied identically to the internal angle <A formed by the first oblique plate 12 and the second oblique plate 28, as shown in FIG. 3(C), and the internal angle <C formed by the fifth oblique plate 31 and the sixth oblique plate 6, as shown in FIG. 3(d).

The reason that the internal angles <A, <B and <C of the upper surface plate 1, the lower surface plate 4, and the up and down moving support plate 3 formed based on the vertical support plate 2 become 90° is because the respective components which are folded each other have to be horizontal or vertical accurately for precise and stable printing.

Figure 4:
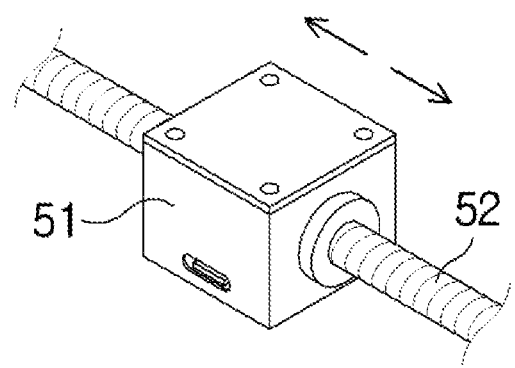
FIG. 4 is a schematic perspective view of a moving motor in a portable 3D printer according to the present invention.

As shown in FIG. 4, a rotation shaft of the motor 51, that is, the rotation shaft on a center is formed as a moving shaft 52 in a screw type. Here, when the inside of the motor 51 is rotated, the motor 51 is moved along the moving shaft 52.

Meanwhile, the configuration of the motor 51 may be applied to all of a left and right moving motor 17a, a front and rear moving motor 15a, an up and down moving motor 25.

According to the portable 3D printer of the present invention, the left and right moving plate 17 of the upper surface plate 1 moves leftward and rightward along the left and right rotation shaft 19 through the rotation of the left and right moving motor 17d and the left and right moving plate 17 is linked with the left and right rotation shaft 19 to move s frontward and rearward along the front and rear moving shaft 15 by the front and rear moving plate 16 which moves leftward and rearward.

That is, the portable 3D printer of the present invention prints as a flat surface printer by the nozzle 17b on a lower part of the left and right moving plate 17 while the left and right moving plate 17 moves frontward and rearward and leftward and rightward.

The up and down moving plate 3 moves upward and downward along the screw of the up and down rotation shaft 24 which is rotated by the up and down motor 25 while maintain the support plate 3 adjacent to the horizontal moving plate 23 to be horizontal. The printing material provided on a lower part of the lower surface plate 4 is ejected from the nozzle 17b provided on a lower part of the left and right moving plate 17.

As shown in FIG. 3(b), the lower surface plate 4 is rotated at an angle of 270° based on the vertical support plate 2 and the third oblique support plate 29 of 45° and the fourth oblique support plate 41 of 45° are engaged horizontally to be supported firmly at a right angle of 90°, and as shown in FIG. 3(b), the second oblique support plate 28 of 45° of the vertical support plate 2 of 45 and the first oblique support plate 12 of 45° of the upper surface plate 1 are engaged to be formed firmly at a right angle of 90° so that 3D printing is possible using an accurate 3D printer of the present invention.

As shown in FIGS. 2(C) and 3(d), the moving support plate 3 is rotated upward and downward at 90° around the rotation base shaft 33 such that the fifth oblique support plate 31 and the sixth oblique support plate 32 are engaged to be supported horizontally.

According to the portable 3D printer configured as described above, as shown FIGS. 3(a) (b) (c) (d), the upper surface plate 1 and the vertical support plate 2 are arranged firmly at a right angle of 90°, the vertical support plate 2 and the lower surface plate 4 are arranged firmly at a right angle of 90°, and the up and down moving plate 3 is arranged at a right angle of 90° based on the horizontal support plate 2 so that a precise and stable 3D printing is possible and further the upper surface plate 1 and the lower surface plate 4 are rotated at 270° based on the vertical support plate 2 and thus it can be folded as a thin film structure.

Further, if necessary, as shown in FIG. 4, the rotation shaft structure of the moving motors 15a, 25, 51 which are used for the front and rear moving plate 16, the left and right moving plate 17a and the up and down rotation shaft 24 may be formed as the moving shaft 52 which passes through the inside of the motor.

Figure 5:
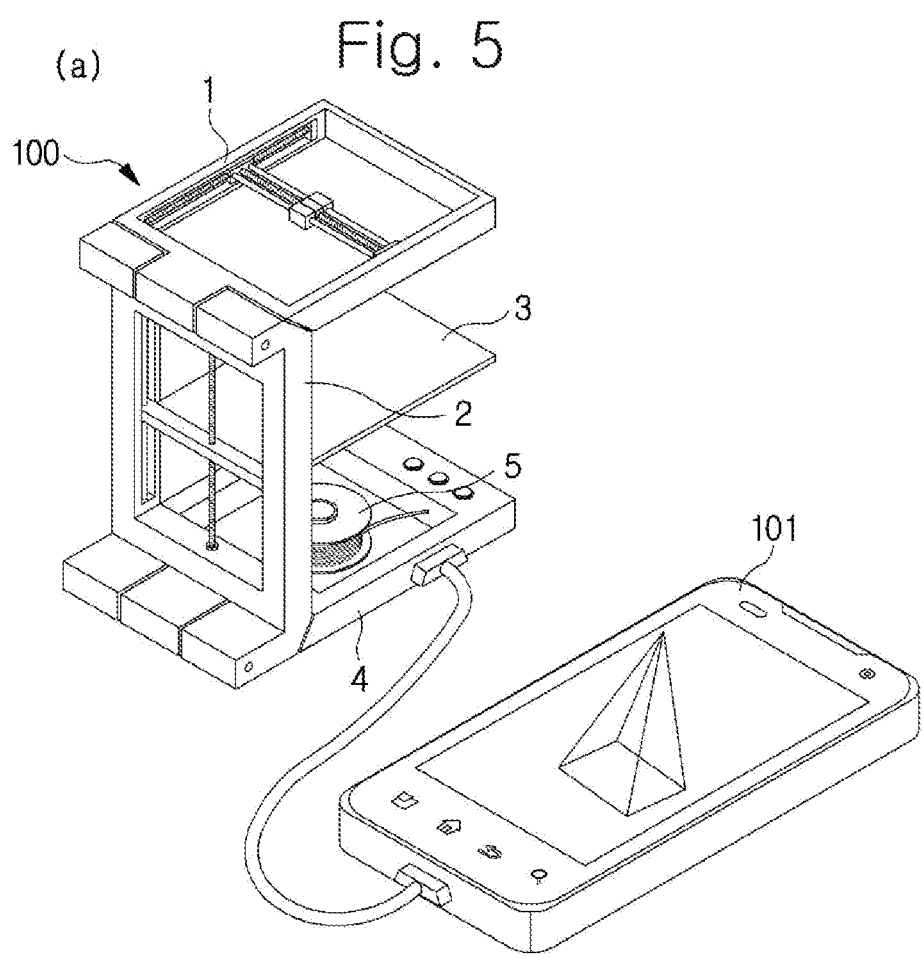
FIG. 5 is a schematic perspective view of a portable 3D printer which is linked with a smart phone according to the present invention.
Figure 6:
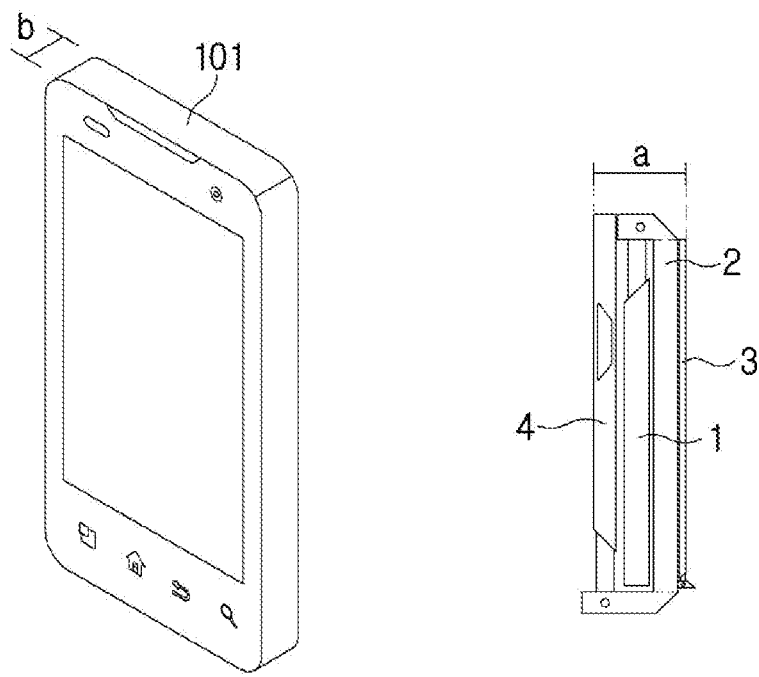
FIG. 6 is a comparison view in a thickness of a portable 3D printer and a smart phone.

Accordingly, as shown in FIG. 5, the portable 3D printer of the present invention may be linked with a smart phone while it is used as a portable 3D printer 100 and as shown in FIG. 6, it can be folded and carried in a pocket in a small volume while it is carried.

Further, as shown in FIGS. 3(a) and 6, the portable 3D printer of the present invention may be carried in a folded structure of a thin film structure and the size of which is ranged from a minimum volume where it can be put on a palm to a size of a brief case so that it can be used widely for carrying, school education and connection to smart phone.

According to the present invention, the portable 3D printer can be folded as a thin film structure such as a smart phone when it is carried, and the upper surface plate, the vertical support plate and the lower surface plate are supported each other at a right angle of 90° thereby to 3D print an object accurately so that a user can use and carry simply it while it is liked with a smart phone.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A portable 3D printer system comprising an upper surface plate (1) having a moving motor at an upper end of the portable 3D printer system and a lower surface plate (4) having an electronic circuit at a lower end of the portable 3D printer system with respect to a vertical support plate (2) provided with an up and down moving plate (3), comprising:
   a first rectangular support plate (12) which is formed on one end of the upper surface plate (1);
   a second rectangular support plate (28) which is provided on an upper end of the vertical support plate (2);
   a third rectangular support plate (29) which is provided on a lower end of the vertical support plate (2);
   a fourth rectangular support plate (41) which is formed on one end of the lower surface plate (4);
   an up and down rotation shaft (24) which is provided vertically on a middle of the vertical support plate (2);
   the up and down moving plate (3) which moves up and down by the up and down rotation shaft (24);
   a fifth rectangular support plate (31) which is provided on the up and down moving plate (3);
   a sixth rectangular support plate (32) which is provided on one end of the fifth rectangular support plate (31), said sixth rectangular support plate (32) configured to be rotated upward on a rotation base shaft (33);
   an upper surface protruding plate (11) which is protruding from the center of the first rectangular support plate (12);
   an upper surface support (27) having a groove formed in the center of the second rectangular support plate (28) into which the upper surface protruding plate (11) is inserted;
   a rotary shaft (6) which is provided so that the upper surface protruding plate (11) inserted between the upper surface support (27) rotates with respect to the upper surface support (27) on a rotation axis;
   a lower surface protrusion (42) which is protruding from the middle of the fourth rectangular support plate (41);
   a lower surface support (26), on a center of which a groove is formed so that the lower surface protrusion (42) is inserted; and
   a rotation base shaft (7) which is provided such that the lower surface support (26) rotates with respect to the lower surface protruding portion (42) on a second rotation axis,
   wherein, when the portable 3D printer system is in use, the upper surface plate (1) is rotated at the upper end of the vertical support (2) so that the first rectangular support plate (12) and the second rectangular support plate (28) are engaged with each other and thus are stably fixed at an inner angle of 90°, and the lower surface plate (4) is rotated at the lower end of the vertical support plate (2) so that the third rectangular support plate (29) and the fourth rectangular support plate (41) are engaged with each other and thus are stably fixed at an inner angle of 90°, and
   when the portable 3D printer system is in a carry position, the portable 3D printer system is configured in a way such that the vertical support plate (2) and the up and down moving plate (3), and the upper surface plate (1) and the lower surface plate (4) are folded so that the upper surface plate (1) and the vertical support plate (2) are folded between the lower surface plate (4) and the up and down moving plate (3).

* * * * *